United States Patent
Kawano et al.

(10) Patent No.: US 9,270,162 B2
(45) Date of Patent: Feb. 23, 2016

(54) SWITCHING REGULATOR AND ELECTRONIC DEVICE

(71) Applicant: Seiko Instruments Inc., Chiba-shi, Chiba (JP)

(72) Inventors: Akihiro Kawano, Chiba (JP); Michiyasu Deguchi, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 54 days.

(21) Appl. No.: 14/195,274

(22) Filed: Mar. 3, 2014

(65) Prior Publication Data

US 2014/0247523 A1    Sep. 4, 2014

(30) Foreign Application Priority Data

Mar. 4, 2013   (JP) ................................. 2013-042150

(51) Int. Cl.
| | |
|---|---|
| *H02H 3/08* | (2006.01) |
| *H02H 9/02* | (2006.01) |
| *H02M 1/32* | (2007.01) |
| *H02M 3/158* | (2006.01) |
| *H02H 7/00* | (2006.01) |
| *H02H 9/00* | (2006.01) |

(52) U.S. Cl.
CPC . *H02M 1/32* (2013.01); *H02H 9/02* (2013.01); *H02M 3/158* (2013.01)

(58) Field of Classification Search
CPC .................................. H02H 3/08; H02H 3/087
USPC ......................................................... 361/93.1
See application file for complete search history.

(56) References Cited

U.S. PATENT DOCUMENTS

| | | | | |
|---|---|---|---|---|
| 7,106,031 B2* | 9/2006 | Hayakawa | ............ | H02M 3/158 323/224 |
| 2009/0039853 A1* | 2/2009 | Omi | ...................... | H02M 3/156 323/284 |
| 2009/0153124 A1* | 6/2009 | Ishii | ...................... | H02M 3/156 323/290 |
| 2010/0102788 A1* | 4/2010 | Kuroyabu | ............. | H02M 3/156 323/282 |
| 2012/0049829 A1* | 3/2012 | Murakami | .............. | H02M 1/32 323/288 |

FOREIGN PATENT DOCUMENTS

JP             03-052556 A         3/1991

* cited by examiner

*Primary Examiner* — Dharti Patel
(74) *Attorney, Agent, or Firm* — Brinks Gilson & Lione

(57) ABSTRACT

There is provided a switching regulator including an overcurrent protection circuit which is able to automatically return from an overcurrent state. The switching regulator includes an error amplification circuit which amplifies a difference between a feedback voltage and a reference voltage based on an output voltage and outputs the amplified difference; a PWM comparator which compares an output of the error amplification circuit with an output of a triangular wave oscillation circuit, and controls an output transistor; an overcurrent detection circuit which monitors a load current flowing through a load connected to an output terminal, detects that the load current is an overcurrent, and outputs an overcurrent detection signal causing a switching operation to stop; and a negative feedback control circuit which receives the overcurrent detection signal, and controls the load current to a predetermined current value.

5 Claims, 4 Drawing Sheets

SWITCHING REGULATOR AND ELECTRONIC DEVICE

RELATED APPLICATIONS

This application claims priority under 35 U.S.C. §119 to Japanese Patent Application No. 2013-042150 filed on Mar. 4, 2013, the entire content of which is hereby incorporated by reference.

BACKGROUND OF THE INVENTION

1. Field of the Invention

The present invention relates to a switching regulator which outputs a constant voltage, and more specifically to an overcurrent protection circuit which protects the circuit by suppressing a supply of a current to an output terminal when an overcurrent flows to the output terminal.

2. Background Art

A switching regulator is used as a voltage source for circuits of various electronic devices. The switching regulator is able to output a constant voltage to an output terminal regardless of voltage variation of an input terminal, but when the current that is supplied to a load from the output terminal rapidly increases thereby exceeding a maximum allowable current, it is important for an overcurrent protection circuit to protect the circuit by suppressing a supply of the current.

FIG. 4 is a block diagram of a switching regulator control circuit of the related art.

The switching regulator control circuit of the related art is configured to have a triangular wave oscillation circuit 1, an error amplification circuit 2, a PWM comparator 3, an error amplifier output detection circuit 4, a timer circuit 5, an AND circuit 6, a reference voltage circuit 7, and a buffer circuit 8.

The reference voltage circuit 7 outputs a reference voltage Vref1, and the triangular wave oscillation circuit 1 outputs a triangular wave Vramp which oscillates between an upper level VH and a lower level VL. The error amplification circuit 2 compares a feedback voltage Vfb of an output voltage Vout of the switching regulator with a reference voltage Vref1, amplifies a difference voltage therebetween, and outputs a voltage Verr. The PWM comparator 3 compares the voltage Verr of the error amplification circuit 2 with the triangular wave Vramp, and outputs a PWM signal Vpwm. The AND circuit 6 performs a control based on outputs of the timer circuit 5 and the PWM signal Vpwm. The buffer circuit 8 performs a power amplification of an output of the AND circuit 6, and outputs the amplified signal to a driver transistor (not illustrated). The error amplifier output detection circuit 4 monitors the voltage Verr of the error amplification circuit 2. The timer circuit 5 starts a count according to the output result of the error amplifier output detection circuit 4.

Here, the error amplifier output detection circuit 4 includes a reference voltage circuit which outputs a reference voltage Vref2 (>VH), and a comparator which compares the voltage Verr of the error amplification circuit 2 with the reference voltage Vref2. At the time of an overload state which is Verr>Vref2, the comparator outputs an overload state detection signal to the timer circuit 5. The timer circuit 5 starts the count, and outputs the overload state detection signal to the AND circuit 6 after a predetermined time elapses. Then, the AND circuit 6 controls the driver transistor so as to be turned off. Since the output voltage Vout decreases until 0 V, a difference voltage between the reference voltage Vref and the feedback voltage Vfb increases, a relationship of Verr>Vref2 is maintained, and the driver transistor is kept turned off. Thus, the output transistor is protected from the overload state (for example, patent document 1).

[Patent Document 1] Japanese Patent Application Laid-Open No. 3-52556

SUMMARY OF THE INVENTION

However, a switching regulator of the related art has a problem that although the cause of an overcurrent is eliminated, a switching operation is unable to be started again if a timer circuit 5 is not reset by external means. In addition, there is a problem that when the switching regulator is used in a device such as a portable battery including an USB output, since the battery is unable to be removed, the timer circuit is unable to be reset, and thereby an overcurrent state is unable to be released.

In order to solve the problems of the related art, a switching regulator according to the present invention is configured as follows.

There is provided a switching regulator including: an error amplification circuit which amplifies a difference between a feedback voltage and a reference voltage based on an output voltage and outputs the amplified difference; a PWM comparator which compares an output of the error amplification circuit with an output of a triangular wave oscillation circuit, and controls an output transistor; an overcurrent detection circuit which monitors a load current flowing through a load connected to an output terminal, detects an overcurrent generated from the load current, and outputs an overcurrent detection signal causing a switching operation to stop; and a negative feedback control circuit which receives the overcurrent detection signal, and controls the load current to a predetermined current value.

The switching regulator according to the present invention is able to detect the overcurrent from a load current, and limits the load current to a constant current value regardless of a load resistance. In addition, it is possible to automatically detect a released overcurrent and return to a normal state.

DETAILED DESCRIPTION OF THE PREFERRED EMBODIMENTS

Hereinafter, the present embodiment will be described with reference to the drawings.

Figure 1:
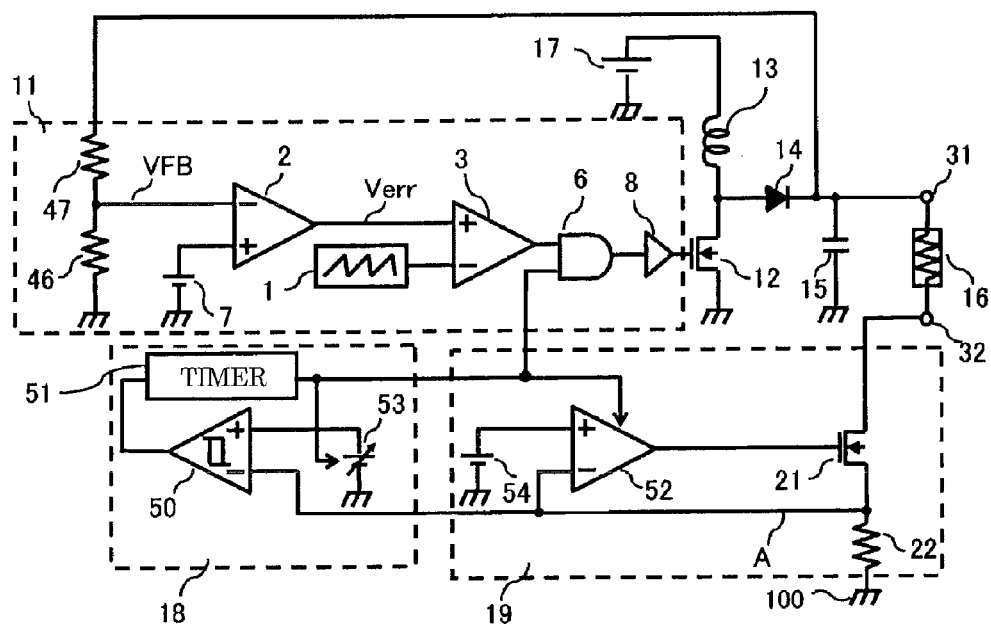
FIG. 1 is a circuit diagram illustrating a switching regulator according to the present embodiment.

FIG. 1 is a circuit diagram illustrating a switching regulator according to the present embodiment. The switching regulator according to the present embodiment includes a switching regulator control circuit 11, a driver transistor 12, a coil 13, a diode 14, an output capacitor 15, an overcurrent detection circuit 18, a negative feedback control circuit 19, an output terminal 31, an external terminal 32, and a VSS terminal 100.

The overcurrent detection circuit 18 includes a timer circuit 51, a comparator 50, and a reference voltage circuit 53.

The negative feedback control circuit 19 includes an amplifier 52, a reference voltage circuit 54, an NMOS transistor 21, and a resistor 22.

The switching regulator control circuit 11 includes an error amplification circuit 2, a reference voltage circuit 7, a triangular wave oscillation circuit 1, a PWM comparator 3, an AND circuit 6, a buffer circuit 8, and resistors 46 and 47.

An inverting input terminal of the error amplification circuit 2 is connected to a connection point between one terminal of the resistor 46 and one terminal of the resistor 47, a non-inverting input terminal of the error amplification circuit 2 is connected to a positive electrode of the reference voltage circuit 7, and an output terminal of the error amplification circuit 2 is connected to a non-inverting input terminal of the PWM comparator 3. The other terminal of the resistor 46 is connected to the VSS terminal 100, and the other terminal of the resistor 47 is connected to the output terminal 31. A negative electrode of the reference voltage circuit 7 is connected to the VSS terminal 100. A non-inverting input terminal of the PWM comparator 3 is connected to an output terminal of the triangular wave oscillation circuit 1, and an output terminal of the PWM comparator 3 is connected to a first input terminal of the AND circuit 6. A non-inverting input terminal of the amplifier 52 is connected to a positive electrode of the reference voltage circuit 54, an inverting input terminal of the amplifier 52 is connected to a connection point (node A) between a source of the NMOS transistor 21 and one terminal of the resistor 22, and an output terminal of the amplifier 52 is connected to a gate of the NMOS transistor 21. The other terminal of the resistor 22 is connected to the VSS terminal 100, and a negative electrode of the reference voltage circuit 54 is connected to the VSS terminal 100. A non-inverting input terminal of the comparator 50 is connected to a positive electrode of the reference voltage circuit 53, an inverting input terminal of the comparator 50 is connected to a connection point between a source of the NMOS transistor 21 and one terminal of the resistor 22, and an output terminal of the comparator 50 is connected to an input terminal of the timer circuit 51. An output terminal of the timer circuit 51 is connected to a second input terminal of the AND circuit 6, and further performs switching of a voltage of the reference voltage circuit 53 and a control of ON and OFF of the amplifier 52. A drain of the NMOS transistor 21 is connected to the external terminal 32. An input terminal of the buffer 8 is connected to an output terminal of the AND circuit 6, and an output terminal of the buffer 8 is connected to a gate of the driver transistor 12. A drain of the driver transistor 12 is connected to a connection point between one terminal of the coil 13 and an anode of the diode 14, and a source of the driver transistor 12 is connected to the VSS terminal 100. The other terminal of the coil 13 is connected to a positive electrode of a direct current power supply 17. One terminal of the output capacitor 15 is connected to both a cathode of the diode 14 and the output terminal 31, and the other terminal of the output capacitor 15 is connected to the VSS terminal 100. An electronic device connected to both the output terminal 31 of the switching regulator and the external terminal 32 functions as a load resistor 16.

The reference voltage circuit 53 normally outputs a reference voltage VREF3 used for overcurrent detection, and outputs a reference voltage VREF4 used for overcurrent release at the time of the overcurrent detection. The reference voltage circuit 54 outputs a reference voltage VREF5 used for an output current limit.

Figure 2:
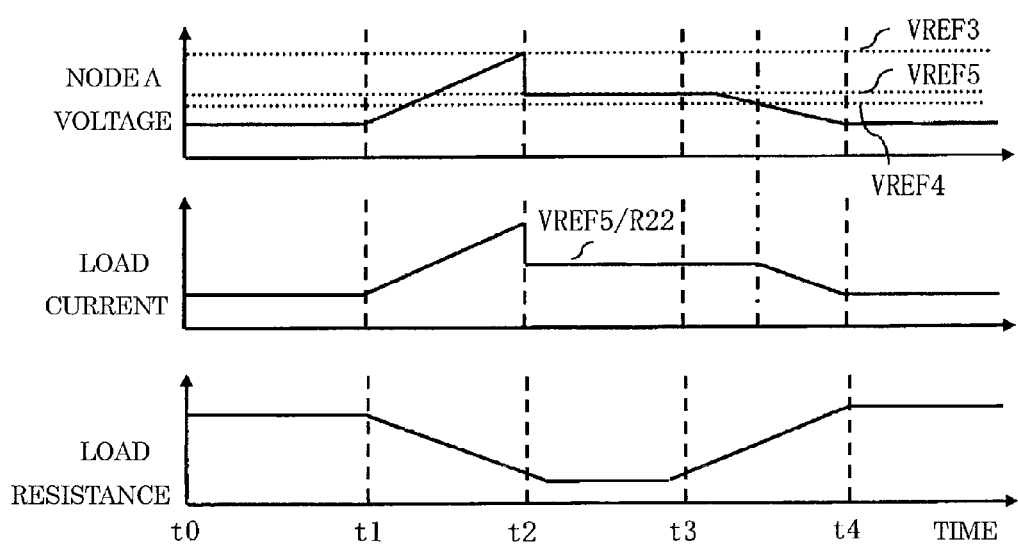
FIG. 2 is a timing chart illustrating an operation of a switching regulator according to the present embodiment.

An operation of the switching regulator according to the present embodiment will be described. FIG. 2 is a timing chart illustrating the operation of the switching regulator according to a first embodiment.

When the direct current power supply 17 starts up, a voltage of the direct current power supply 17 is applied to the output terminal 31 through the coil 13 and the diode 14, and an output voltage Vout of the output terminal 31 rises. The resistors 47 and 46 divide the output voltage Vout and generate a feedback voltage VFB. The error amplification circuit 2 outputs a voltage Verr based on the feedback voltage VFB and a voltage of the reference voltage circuit 7. The PWM comparator 3 compares the voltage Verr with a triangular wave output from the triangular wave oscillation circuit 1, and outputs a rectangular wave. The rectangular wave is input to the gate of the driver transistor 12 through the AND circuit 6 and the buffer 8, and controls ON and OFF of the driver transistor 12. The voltage Verr is able to control a duty cycle of the rectangular wave, and controls the ON and OFF of the driver transistor 12 based on the duty cycle, thereby generating a constant voltage in the output terminal 31. This state is called a normal state. During a period between time t0 and time t1 in FIG. 2, a predetermined resistance is generated in the load resistor 16, and the normal state is maintained.

A period between the time t1 and time t2 shows a state of a heavy load 1 in which a resistance value of the load resistor 16 is decreased. When the resistance value of the load resistor 16 is decreased, a load current flowing through the load resistor 16 increases, and thereby a voltage of the node A rises. When the voltage of the node A rises and then exceeds the reference voltage VREF3, an overcurrent detection signal is output from the comparator 50. The timer circuit 51 starts a count and outputs the overcurrent detection signal after a predetermined time has elapsed. A voltage of the reference voltage circuit 53 is changed to the voltage VREF4 by the overcurrent detection signal, the driver transistor 12 is turned off by the overcurrent detection signal transferred through the AND circuit 6 and the buffer circuit 8, and the amplifier 52 starts to operate.

A period between the time t2 and time t3 shows an overcurrent state at the time of the overcurrent detection signal output. The voltage of the node A is decreased to the reference voltage VREF5 as the amplifier 52 controls the NMOS transistor 21. Then, a gate-source voltage of the NMOS transistor 21 is decreased, an ON resistance of the NMOS transistor 21 is increased, and thus the load current is limited. The current flowing through the NMOS transistor 21 does not exceed a current determined by the reference voltage VREF5 and the resistor 22, and when the resistance value of the resistor 22 is referred to as R22, the current is limited to a value equal to or lower than a current value of VREF5/R22. Thus, the load current at the time of the overcurrent is limited to a constant current value regardless of a value of the load resistor 16, and thereby it is possible to prevent the overcurrent from occurring.

A period between the time t3 and time t4 shows a state of a heavy load 2 in which the load resistor 16 is open or the resistance value thereof is increased. The resistance value of the load resistor 16 is increased, and thereby the load current flowing through the load resistor 16 decreases, but the load current is maintained to the load current of VREF5/R22 for a while by the control of the amplifier 52, and the voltage of the node A is also maintained to the reference voltage VREF5. Further, when the voltage of the node A is decreased lower than the reference voltage VREF4 by the load current which flows through the load resistor 16 and is decreased, the overcurrent detection signal of the comparator 50 is inverted. Then, the voltage of the reference voltage circuit 53 is changed to the reference voltage VREF3, the operation of the amplifier 52 is stopped, and an output limit of the AND circuit 6 is released. Thus, the switching regulator performs a normal control, and the control of the load current is stopped by the operation of the amplifier 52 which is stopped.

After the time t4, the switching regulator returns to the normal state in which the normal operation is performed. In this way, after limiting the load current by detecting the overcurrent, the switching regulator according to the present embodiment is able to return to the normal control by automatically detecting that the overcurrent is released.

Figure 3:
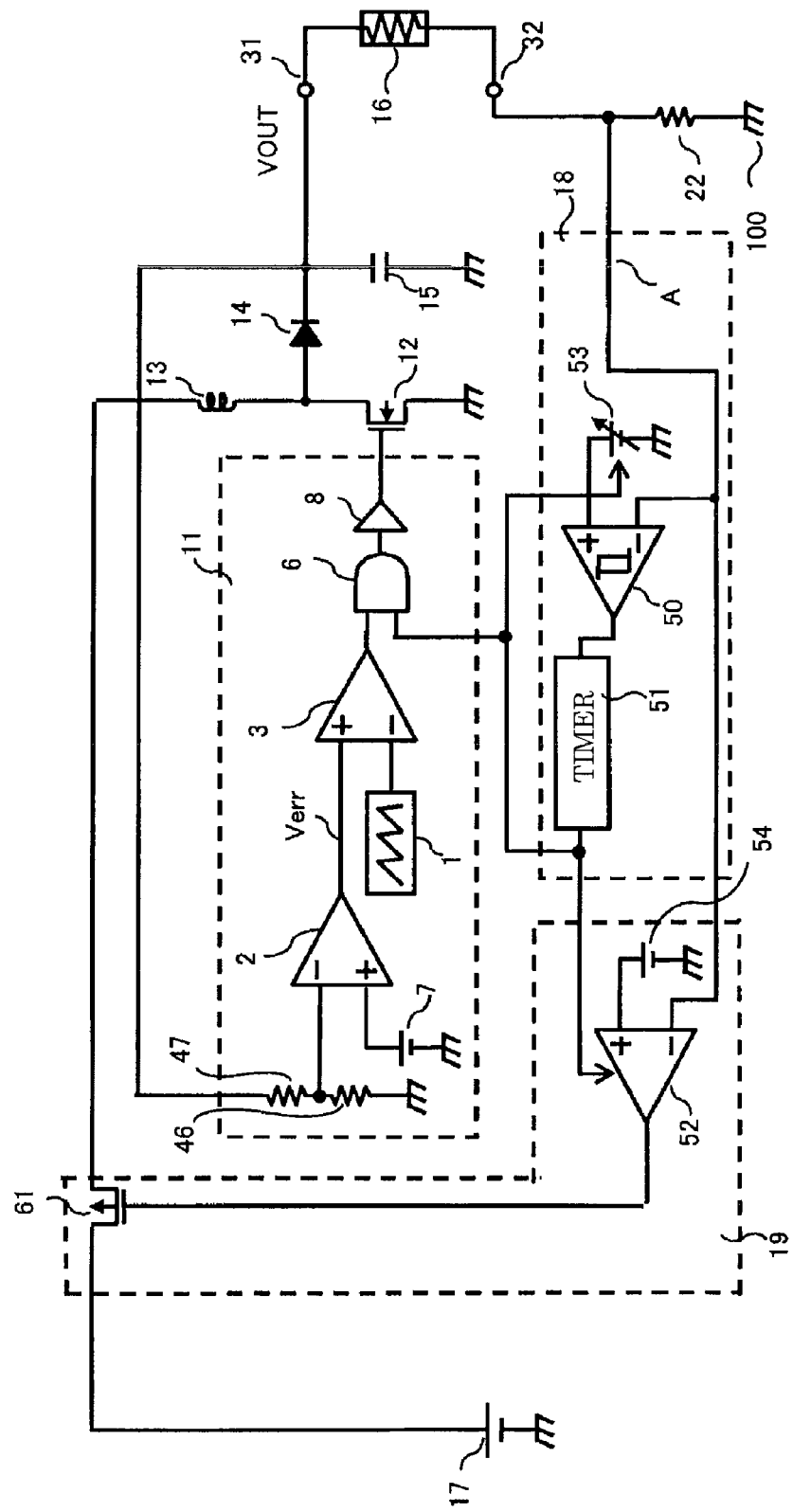
FIG. 3 is a circuit diagram illustrating another example of a switching regulator according to the present embodiment.
Figure 4:
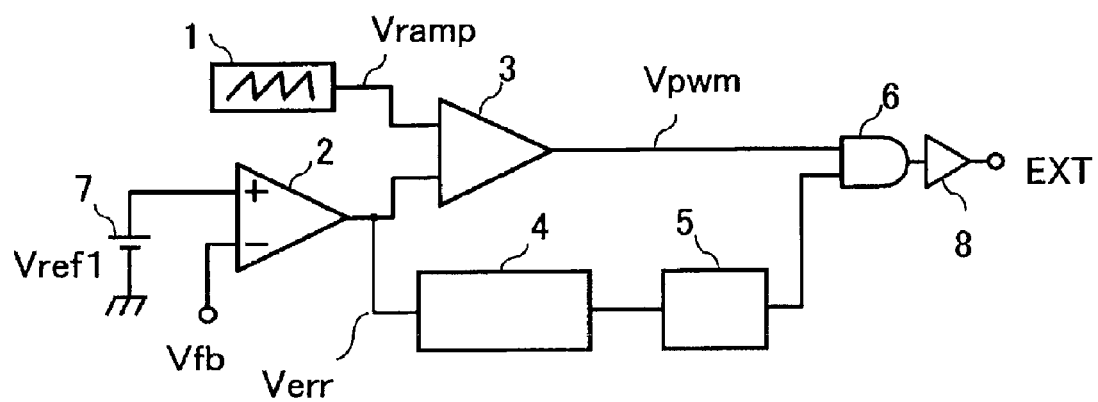
FIG. 4 is a block diagram of a switching regulator control circuit of the related art.

FIG. 3 is a circuit diagram illustrating another example of the switching regulator according to the present embodiment. A difference between a circuit in FIG. 3 and the circuit in FIG. 1 is that the NMOS transistor 21 in FIG. 1 is replaced with a PMOS transistor 61 in FIG. 3. That is, the amplifier 52, the reference voltage circuit 54, and the PMOS transistor 61 configure the negative feedback control circuit 19, and an inverting input terminal of the amplifier 52 is connected to the connection point between the external terminal 32 and the resistor 22, and the output terminal of the amplifier 52 is connected to a gate of the PMOS transistor 61. A drain of the PMOS transistor 61 is connected to the coil 13, and a source of the PMOS transistor 61 is connected to the positive electrode of the direct current power supply 17. Others are the same as those of the circuit in FIG. 1.

An operation of the switching regulator in FIG. 3 will be described.

During the period between the time t1 and time t2, the resistance value of the load resistor 16 is decreased, thereby increasing the load current flowing through the load resistor 16, and thus the voltage of the node A rises. When the voltage of the node A rises and then exceeds the reference voltage VREF3, the overcurrent detection signal from the comparator 50 is output. The timer circuit 51 starts the count and outputs the overcurrent detection signal after the predetermined time has elapsed. The voltage of the reference voltage circuit 53 is changed to the voltage VREF4 by the overcurrent detection signal, and the driver transistor 12 is turned off by the overcurrent detection signal transferred through the AND circuit 6 and the buffer circuit 8, and the amplifier 52 starts to operate.

The period between the time t2 and time t3 shows the overcurrent state at the time of the overcurrent detection signal output. The voltage of the node A is decreased to the reference voltage VREF5 as the amplifier 52 controls the PMOS transistor 61. Then, a gate-source voltage of the PMOS transistor 61 is decreased, an ON resistance of the NMOS transistor 21 is increased, and thus the load current is limited. The current flowing through the PMOS transistor 61 does not exceed the current determined by the reference voltage VREF5 and the resistor 22, and the current is limited to a value equal to or lower than the current value of VREF5/R22. Thus, the load current at the time of the overcurrent is limited to the constant current value regardless of the value of the load resistor 16, and thereby it is possible to prevent the overcurrent from occurring.

The period between the time t3 and the time t4 shows the state of the heavy load 2 in which the load resistor 16 is open or the resistance value thereof is increased. The resistance value of the load resistor 16 is increased, and thereby the load current flowing through the load resistor 16 decreases, but the load current is maintained to the load current of VREF5/R22 for a while by the control of the amplifier 52, and the voltage of the node A is also maintained to the reference voltage VREF5. Further, when the voltage of the node A is decreased lower than the reference voltage VREF4 by the load current which flows through the load resistor 16 and is decreased, the overcurrent detection signal of the comparator 50 is inverted. Then, the voltage of the reference voltage circuit 53 is changed to the reference voltage VREF3, the operation of the amplifier 52 is stopped, and the output limit of the AND circuit 6 is released. Thus, the switching regulator performs the normal control, and the control of the load current is stopped by the operation of the amplifier 52 which is stopped.

The present embodiment is described using a voltage step-up type switching regulator, but a voltage step-down type or a voltage step-up and step-down type may also be used, and is not limited to a type of the switching regulator.

In addition, a signal delay time of the timer circuit 51 may be appropriately set, and if not particularly required, the timer circuit 51 may be removed.

As described above, it is possible for the switching regulator according to the present embodiment to detect the overcurrent from the load current, to limit the load current to the constant current value regardless of the load resistance, and to protect the output transistor from the overcurrent. In addition, it is possible to automatically detect the released overcurrent and return to the normal state.

What is claimed is:

1. A switching regulator comprising:
   an error amplification circuit which amplifies a difference between a feedback voltage and a reference voltage based on an output voltage and outputs the amplified difference;
   a PWM comparator which compares an output of the error amplification circuit with an output of a triangular wave oscillation circuit, and controls an output transistor;
   an overcurrent detection circuit monitors a load current flowing through a load connected to an output terminal via a sense resistor through which the load current flows, detects an overcurrent generated from the load current, and outputs an overcurrent detection signal causing a switching operation to stop; and
   a negative feedback control circuit which receives the overcurrent detection signal, and, while the overcurrent condition is detected, controls and holds the load current to a predetermined current value greater than zero until the overcurrent condition is removed.

2. The switching regulator according to claim 1,
   wherein the overcurrent detection circuit includes:
   a first reference voltage circuit which outputs a reference voltage used for an overcurrent detection in a normal state, and outputs a reference voltage used for an overcurrent release in an overcurrent state; and
   a comparator which compares a voltage based on the load current with the reference voltage used for the overcurrent detection or the reference voltage used for the reference voltage used for the overcurrent release, and when the overcurrent state is detected, outputs the overcurrent detection signal.

3. The switching regulator according to claim 1,
   wherein the negative feedback control circuit includes:
   a transistor which adjusts the load current and is used for a load current limit;
   a second reference voltage circuit which outputs the reference voltage used for the load current limit; and
   an amplifier which compares the voltage based on the load current with the reference voltage used for the load current limit, and outputs a signal controlling the transistor used for the load current limit.

4. The switching regulator according to claim 3, wherein the transistor used for the load current limit is provided between a power supply and the output transistor.

5. An electronic device comprising:
   a power supply; and the switching regulator, which outputs a constant voltage obtained by adjusting a power supply voltage of the power supply, according to claim 1.

* * * * *